Patented Apr. 25, 1939

2,156,173

UNITED STATES PATENT OFFICE 2,156,173

COMPOSITION AND METHOD FOR PREVENTING INCRUSTATION

Paul G. Bird, Western Springs, Ill.

No Drawing. Application March 13, 1937, Serial No. 130,691

2 Claims. (Cl. 87—27)

The present invention relates to a method for preventing the deposit of incrusting salts in water-containing systems as well as to the reagents used for that purpose and their method of preparation.

One of the objects of the invention is to provide a special reagent which when added to water in small quantities will prevent the deposition therefrom of adherent scale and incrusting material.

A further object of the invention is to produce a special reagent from alkali phosphates by fusing it with an acid-reacting material containing sulfate radicals or free sulfuric acid for the purpose of producing a special type of phosphate having incrustation-preventing properties.

A further object of the invention is to provide a reagent which results from the fusing, until clearly molten, of alkali phosphates and acid-reacting substances containing the sulfate radical.

It has already been shown in the past that the deposition of calcium salts and similar incrusting materials from water can be inhibited and in some cases completely prevented by the addition to the water of comparatively small amounts of sodium hexametaphosphate. While this hexametaphosphate is quite efficient, it is rather inconvenient to use because it is highly hygroscopic and hence is difficult to store and difficult to measure.

Applicant has discovered that he can produce a type of phosphate the exact nature of which is unknown but which has many of the inhibiting qualities of sodium hexametaphosphate and without the difficulties of hygroscopicity and lack of solubility which is inherent in sodium hexametaphosphate. Furthermore, the material prepared in accordance with applicant's invention is non-hygroscopic, is easily powdered and hence readily fed into systems by dry feeding devices, and easily measured and handled by the user. Another advantage is that the material has a high rate of solubility when in powdered form, while sodium hexametaphosphate, on the other hand, dissolves rather slowly. In carrying out that part of the present invention which relates to the manufacture of incrustation-preventing reagents, an alkali phosphate and sulfuric acid are fused until a clear melt is obtained. For most purposes, however, sodium acid sulfate (NaHSO$_4$) is preferred. The alkali phosphate may be either sodium or potassium, or may be some waste material containing considerable quantities of sodium phosphate; and the sodium acid sulfate may be the ordinary niter- or salt-cake of commerce.

The use of actual phosphoric acid in connection with sodium acid sulfate or of phosphoric acid, neutral sodium sulfate and free sulfuric acid is also considered to be within the purview of the present invention. In its preferred embodiment, however, the reagent is prepared by fusing approximately 55 parts of anhydrous disodium monohydrogen phosphate (Na$_2$HPO$_4$) with about 45 parts sodium acid sulfate (NaHSO$_4$) until a clear melt is obtained. This melt is then cooled and powdered, thus forming the reagent of the present invention.

It is here pointed out that the results obtained with this reagent are totally different from those which would be obtained in using a mere mixture of sodium monohydrogen phosphate and sodium acid sulfate. There appears to be no doubt that as a result of the fusion the formation of some form of phosphate differing from the ordinary sodium hexametaphosphate, which has been used in water treatment, is obtained. Whether a complicated phosphate-sulfate complex is formed has not been determined, but undoubtedly there is an approach to some form of metaphosphate, although probably it is not the hexametaphosphate. In any event the reagent prepared in accordance with the present invention has remarkable power in preventing the deposition of incrusting material from water containing substances capable of depositing scale.

As an example of the use of the material in connection with softening raw water having a hardness of about 28 grains per gallon, obtained from the vicinity of Hinsdale, Illinois, the addition of as little as 1.27 grains per gallon of the above preferred reagent will reduce the incrustation from this water from 245 milligrams to approximately 17 milligrams. That is to say, if the Hinsdale water is treated with a small excess of sodium carbonate, heavy incrustation usually takes place; but when, in addition to the use of sodium carbonate, 1.27 grains per gallon of applicant's present reagent are employed, the deposit is only 17 milligrams. In order to compare the effect of sodium hexametaphosphate, using an equivalent amount thereof as based on the P$_2$O$_5$ content of applicant's present reagent and of the hexametaphosphate, it is found that the latter material reduces the deposit to only 30 milligrams, thus showing that the present reagent is more efficient than the hexametaphosphate. When using unsoftened Hinsdale water, it is found that the untreated water will yield a deposit of about 125 milligrams, while when 1.27 grains per gallon of applicant's reagent are employed this deposit becomes substantially zero.

In using the reagent, it may be fed into the water dry or may be dissolved in water and the mixture added to the water to be treated.

The reagent is inexpensive, and only small quantities of it are necessary.

The prevention of incrustation on surfaces from which evaporation does not take place is of particular value in connection with boilers, tanks, laundry equipment, heat exchangers, and the like, where scale formation is undesirable, and hence the invention is of considerable commercial utility.

The equipment required for carrying out the invention is simple, and the fusion may be effected in an ordinary iron fusion kettle heated by suitable means. The materials may be introduced separately or together, and the contents of the kettle are heated until a clear molten mass is obtained, whereafter the material is cooled quickly and ground.

Applicant claims:

1. The method of preventing incrustation in systems containing water capable of depositing scale-forming substances which comprises adding to the water therein a small quantity of a fusion product of about 55 parts of sodium monohydrogen phosphate and about 45 parts of sodium acid sulfate.

2. A chemical reagent for preventing incrustation in water-containing systems which consists of about 55 parts of sodium monohydrogen phosphate fused with about 45 parts of sodium acid sulfate.

PAUL G. BIRD.